United States Patent [19]

Häfner et al.

[11] Patent Number: 4,503,337
[45] Date of Patent: Mar. 5, 1985

[54] POWER SUPPLY SYSTEM FOR HEAT AND ELECTRICITY

[75] Inventors: Günther Häfner; Hermann Lenz; Helmut Finger, all of Stuttgart, Fed. Rep. of Germany

[73] Assignee: Daimler-Benz Aktiengesellschaft, Fed. Rep. of Germany

[21] Appl. No.: 372,130

[22] Filed: Apr. 27, 1982

[30] Foreign Application Priority Data

Apr. 27, 1981 [DE] Fed. Rep. of Germany ....... 3116624

[51] Int. Cl.³ .................. F01B 21/00; F01K 17/02; F02C 6/02; F02C 6/04
[52] U.S. Cl. .................. 290/4 D; 60/715; 290/1 A; 290/2
[58] Field of Search .......... 290/1 A, 2, 4 C, 4 D; 60/698, 714–720

[56] References Cited

U.S. PATENT DOCUMENTS 4,085,333  4/1978  Grise et al. .................. 290/2
4,226,214  10/1980  Palazzetti .................... 290/1 A

FOREIGN PATENT DOCUMENTS

15371  6/1911  United Kingdom .............. 60/715

Primary Examiner—J. V. Truhe
Assistant Examiner—Shelley Wade
Attorney, Agent, or Firm—Craig & Burns

[57] ABSTRACT

A power supply system for generating at least one of heat and electricity which includes a number of statically and functionally independent units adapted to generate at least one of heat and electricity which enable a maximum utilization of primary energy. For decentralized power supply over short and low loss supply lines the individual units are constructed as stackable modules. By exchanging or adding one or more modules, it is possible to adapt the flexibility of the power supply system to changes in demand for the energy thereby providing a practical approach to the utilization of waste heat for energy conservation purposes.

29 Claims, 12 Drawing Figures

POWER SUPPLY SYSTEM FOR HEAT AND ELECTRICITY

The present invention relates to a supply system and, more particularly, to a power supply system for heat and electricity.

In, for example, Offenlegungsschrift 28 32 819, a system is proposed for the combined generation of energy and heat which includes a plurality of units each having an internal combustion engine for generating mechanical energy and waste heat to assist further in driving an electric generator driven by the engine. With regard to all of the functions of the units, aside from supply and removal, all of the units are independent and are housed in a statically independent, cube shaped coordinated stackable and preferably sound insulating frame or housing, with supply and removal lines of all types ending at connections on only one side of the frame or housing.

In conventional heat engines or heat plants such as gas engines, gas turbine plants or steam turbine plants, the efficiency and the generation of mechanical energy is very low because a large proportion of the primary energy injected occurs in the form of waste heat, with the waste heat accounting for approximately two-thirds of the primary energy injected. Even with stationary heating and power plants, which are designed for a central generation of thermal energy, the designers have resorted to coupling the generation of power or electricity with a generation of heat in such a manner that the mechanical energy released by an internal combustion engine is employed to generate electricity and the waste heat energy is used for heating purposes. By such an arrangement, a very high overall coefficient of utilization of the primary energy is realized.

In this connection, block heating and power stations have been described in, for example, VDI (Society of German Engineers) report No. 259,1976; DE-Z (Steam Generation Journal) "Community Management", 1976, pages 63 et seq; VDI Notice No. 12, March 25, 1977, entitled "Natural Gas Engines Instead of Boilers"; Offenlegungsschrift 28 07 075, and U.S. Pat. No. 4,150,300.

A disadvantage of the coupling of power and heat resides in the fact that the thermal energy can be delivered to widely scattered consumers only in the form of a heatable flow medium. However, in the delivery process, the flow medium may cool off thereby causing a great deal of thermal energy to be lost. Additionally, the pipeline networks which must be provided in duplicate are very expensive when the thermal energy has to be distributed over a large area.

For this reason, it is necessary to situate the plants of a power heat connection as close to the consumers of heat as possible and only electric power may be collected and distributed over large areas with considerable less loss and at considerably lower costs.

The siting or location of power/heat generation plants near to the consumers requires that only relatively small power/heat generation plants, designed for a limited group of consumers, be constructed so that the losses for the heat conveyance may be maintained at a low level by virtue of short distribution distances to the respective consumers. Therefore, the generation of heat must be distributed along many heat generating plants located near the consumers. On the other hand, such a parcelling or dealing out of the heat generation to a large number of plants has many disadvantages from the manufacturing point of view.

More particularly, large power/heat generation plants may be manufactured and constructed at a lower cost than a small number of plants which overall generate the same amount of power. Furthermore, another disadvantage of a decentralized arrangement of many small power/heat generation plants resides in the fact that the supply area allocated to the respective plants may easily overload the heat generation system due to structural changes or similar developments in the particular area being served by the plants. Moreover, balancing of other areas where the demand for heat is declining is impossible with the decentralized heat supply system.

While it is true from the above-noted Offenlegungsschrift No. 28 32 819, that arrangements have been proposed for manufacturing smaller units for decentralized heat and electrical supply by utilizing mass production, that is, cheaply produced components, with such components being housed in independent units in a stackable and functionally independent containers, thereby enabling power supply plants of different sizes to be put together by combining different numbers of the individual power supply units or components, a disadvantage of the proposed combined heat and electrical supply system resides in the fact that the two different types of power always occur in a ratio which remains constant within narrow limits. However, this ratio of constant power supply is not matched by a corresponding demand on the part of the consumers so that one of the two types of energy being generated is not fully utilized. On the other hand, this means that unnecessarily high investments must be made and, on the other hand, the primary energy injected is not completely utilized so that this use of electricity/heat combination and decentralized power generation hardly seems to be the proper direction in which to head.

In addition to combining primary power and waste heat, heat alone has also been generated by gasoline fired heat pumps, with waste heat of the internal combustion engine also being utilized for heating purposes as the heat is obtained from the heat pump. An advantage of this arrangement, compared to a normal heating boiler, resides in the fact that, due to the heat being extracted from the environment or from another heat source, more useful heat may readily be delivered by such plant than would correspond to the primary energy injected. Additionally, such a plant can be effectively used to meet the decentralized heat demand which involves few losses. However, the above noted disadvantages of a decentralized power supply system with small units exist with regard to these proposed plants as well.

Therefore, an attempt has been made to achieve cost-advantages by adjusting the types of small units and utilizing such units in large numbers and, for example, in German Gebrauchsmuster No. 79 08 625, an attempt is proposed for connecting the respective units in parallel. In this manner, an easy to service modular technique has been developed which, when there is damage in a cooling portion of the heat pump, makes it possible to quickly replace the defective module with a servicable component part or unit; however, a disadvantage of this proposed construction resides in the fact that this type of plant is strictly limited to heat production alone.

In, for example, Offenlegungsschrict No. 29 13 528, a gasoline fired compound plant for generating electricity and heat is proposed wherein not only the exhaust gas heat of the internal combustion engines but also the coolant or cooling water heat is utilized. In this proposed construction, in a preheating stage, the coolant or water returned from the heating circuit of the heat consumers is preheated, for which purpose a relatively power intensive heat pump circulation system is used. In the heat pump circulation system, the coolant or cooling water of the internal combustion engine, beginning at an upper coolant or cooling water temperature of approximately 85° C., is evaporated by a vacuum or underpressure generated by the heat pump and is recondensed at a relatively high pressure and temperature level. The hot condensate serves to preheat the return water, and the evaporation loss in the cooling water is compensated for by an appropriate injection of the cold return coolant or water. This relatively high expense for utilization of the coolant or cooling water heat is justified only if the return from the heat consumers is just as hot as the hot coolant or cooling water of the internal combustion engines. Then not only the cooling water heat but also the drive energy of the heat pump are used to preheat the returning coolant or water.

The aim underlying the present invention essentially resides in providing an improved decentralized power supply system for generating heat and/or electricity which is constructed in such a manner that individual plants of the system can not only be manufactured and installed more inexpensively but also that the decentralized plants may be easily adapted to any changing conditions with respect to the demand for one of the two types of energy without having to create a balance by diverting energy from other points which are located at remote distance thereby providing a flexible power supply system.

In accordance with advantageous features of the present invention, modular units which are externally essentially alike and which are statically and functionally independent but having different functions are used, with means being provided for easily interconnecting the functionally diverse modular units.

In accordance with the present invention, the modular units may, for example, include a unit provided with an internal combustion engine for generating mechanical energy and waste heat and a heat pump driven by the internal combustion engine. An individual modular unit may also include a steam turbine which at least indirectly drives an electric generator as well as an evaporator which is loaded by exhaust heat of at least one internal combustion engine, a condenser which is loaded by fluid on the heat absorption side as well as a circulation pump within a circulation system which unites or joins the components.

It is also possible in accordance with the present invention, for the modular units to include a heating boiler with at least one burner and a circulation pump and/or units which include a heat exchanger having a circulation pump and/or fan means for the flow media which are to be caused to exchange the heat, as well as drive motors for these components.

Advantageously, other units may be provided for storing heat, with these units including a heat insulating vessel these and/or units may be provided for storing fuel or gasoline with at least one corresponding vessel in each case.

To enable an interconnection of the respective modular units of diverse functions, advantageously, in accordance with the present invention, novel connection means are arranged on the same side of a frame of each unit, with the connection means extending diagonally along a plane of the respective sides in accordance with a screen or grid which is the same for each modular unit.

In accordance with the present invention, all supply and return lines of each unit include a flexible connecting member adapted to be disposed behind the corresponding connection means. The flexible connecting members may be disposed in an area just behind a housing wall of the housing accommodating the components of the respective units.

The connection means may, in accordance with the present invention, be located in an area just behind the plane of the housing wall and engines or engine frames for supporting the engines of the respective units may be elastically supported. The elastic support may take the form of individual springs or air suspension means for suspending the engine or engine frames of the respective units.

To facilitate the operation of the individual units, according to the present invention, each unit of the power supply system includes a separate starting means and control arrangement, with the control arrangement being constructed both to operate the unit by itself and to operate the unit when interconnected with other units.

In order to enable the power supply system of the present invention to be exposed to the elements, the shell or housing accommodating the components of the respective units is constructed and attached in such a manner so as to be weather proof, with at least one of the lateral walls including flaps, doors, or the like for enabling access to the interior of the respective units to permit maintenance or operation thereof.

Advantageously, in accordance with the present invention, each frame or housing of the respective units corresponds, with regard to external dimensions, to a ISO container and, in particular, a 10 foot container. Furthermore, each frame or housing is provided with suspension means in the form of, for example, eyes, in order to make it possible to readily transfer the same by, for example, cranes or the like.

By virtue of the utilization of several independent units having different functions which are essentially externally alike and statically and functionally independent, it is readily possible to construct a mixture of diverse power plants due to the screened or grid arrangement of the connections as well as to provide a power supply system which can equally be quickly converted thereby making the power supply system extremely flexible.

Accordingly, it is an object of the present invention to provide a power supply system for generation of heat and/or electricity which avoids, by simple means, shortcomings and disadvantages encountered in the prior art mentioned above.

Another object of the present invention resides in providing a power supply system for the generation of heat and/or electricity which is simple in construction and therefore relatively inexpensive to manufacture.

Yet another object of the present invention resides in providing a power supply system for generation of heat and/or electricity which is readily adaptable to changing energy conditions.

A further object of the present invention resides in providing a power supply system for the generation of heat and/or electricity which is simple in construction and therefore relatively inexpensive to manufacture.

A still further object of the present invention resides in providing a power supply system for heat and/or electricity which minimizes losses in the conveyance of heat.

Yet another object of the present invention resides in providing a power supply system for the generation of heat and/or electricity which functions realiably under all operating conditions.

A further object of the present invention resides in providing a power supply system for the generation of heat and/or electricity which enables the exchanging or adding of one or more modules so as to adapt flexibility of the system to changes in demand for the energy.

A still further object of the present invention resides in providing a power supply system for the generation of heat and/or electricity which efficiently uses waste heat for energy conservation purposes.

Yet another object of the present invention resides in providing a power supply system for the generation of heat and/or electricity which maximizes the utilization of primary energy into the power supply system.

These and other objects, features, and advantages of the present invention will become more apparent from the following description when taken in connection with the accompanying drawings which show, for the purposes of illustration only, several embodiments in accordance with the present invention, and wherein:

Figure 1:
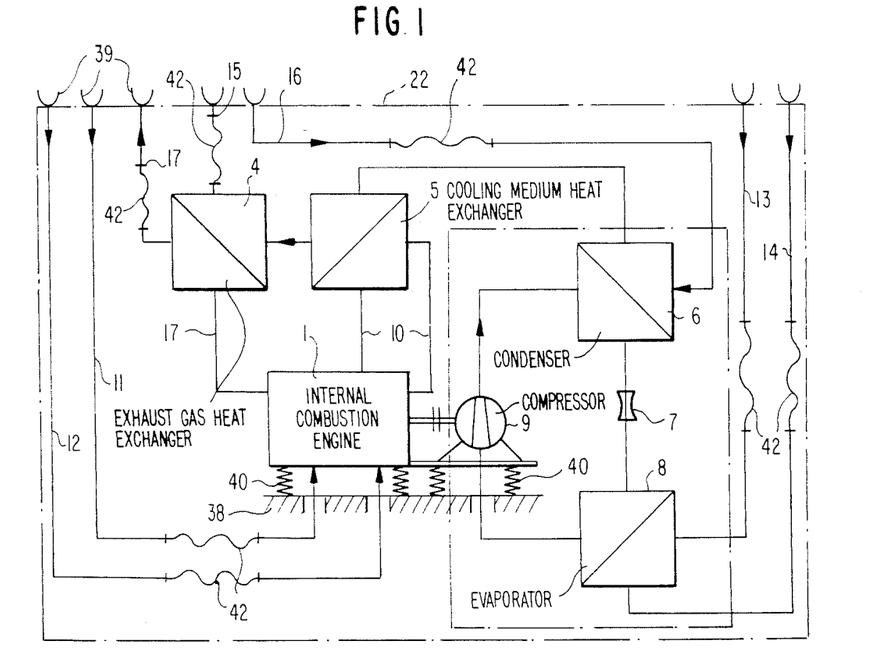
FIG. 1 is a schematic view of a modular unit constructed in accordance with the present invention for generating heat from waste heat of an internal combustion engine and for extracting heat from the environment by means of a heat pump.

Referring now to the drawings, wherein like reference numerals are used throughout the various views to designate like parts and, more particularly, to FIG. 1, according to this Figure, a heat pump unit generally designated by the reference numeral 22 includes an internal combustion engine 1 adapted to drive a compressor 9 of the heat pump unit 22. The cycle or circulation system of the heat pump unit 22, as viewed in a normal direction of flow upstream of the compressor 9, includes a condenser 6, adapted to condense a medium circulated therethrough while releasing the heat in the medium, a relief valve 7, and an evaporator 8, in which the medium is re-evaporated, extracting heat from the environment. The ambient heat is fed to the evaporator 8 in the form of a circulated cooling medium through a heat source supply line 13, with the cooled cooling medium flowing back to the heat source (not shown) through a heat source return line 14.

Waste heat, released by the internal combustion engine 1 to the cooling medium, is released in a cooling medium heat exchanger 5 to a heating medium, which initially, in a first stage, is heated up in the condenser 6 and then, in a second stage, is heated in the cooling medium heat exchanger 5. The cooling medium heat exchanger 5 receives the waste heat from the internal combustion engine 1 contained in the cooling medium through the cooling medium circulation system 10. The waste heat contained in the exhaust gas of the internal combustion engine 1 is also utilized for heating purposes and, for this purpose, an exhaust gas line 17 extends through an exhaust gas heat exchanger 4. The heating medium is heated up in the exhaust gas heat exchanger 4 in a third heating stage and fed or supplied to a heating supply line 15 leading to consumers (not shown). The cooled heating medium from the consumers is fed or supplied to the heating return line 16 and is reheated as it passes through the three heat exchangers 6, 5, and 4 and is once again fed to the heat consumers through the heating supply line 15.

To operate the heat pump unit 22 or the internal combustion engine 1, fuel and combustion air are supplied, with the internal combustion engine 1 receiving fuel through a fuel supply line 11 and the combustion air through an air intake supply line 12. As can readily be appreciated, other means, of conventional construction, which may be necessary, for example, for controlling, adjusting, starting, or stopping of the components are provided.

Figure 10:
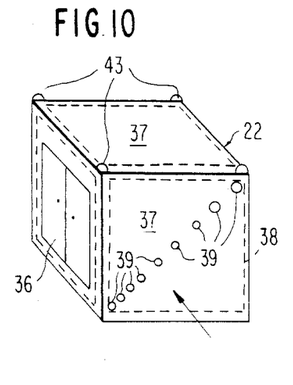
FIG. 10 is a perspective view of a power supply modular unit constructed in accordance with the present invention.

The above described components of the heat pump unit 22 are mounted on a frame 38 and, as shown most clearly in FIG. 10, are accommodated in a noise-sealed statically independent frame or housing formed of a plurality of interconnected space housing walls 37 which are constructed so as to provide heat and/or noise insulation thereby making it possible to utilize to a maximum extent the waste heat and reduce sound emission to an absolute minimum. To facilitate maintenance, operation, or replacement of the components contained in the frame or housing, doors or flaps 36 are provided in one of the housing walls 37. The transmission of sound may also be reduced by providing an elastic suspension or supporting arrangement for the internal combustion engine 1 and the compressor 9 and, for this purpose, the internal combustion engine 1 and compressor 9 on the frame 38 are supported by a large number of springs 40. In order to prevent vibrations and structure borne noises from being transmitted through the different pipe connections to the frame 38 and from the frame 38 to the environment, a flexible noise-insulating and vibration insulating connecting member 42 such as, for example, a bellows-type pipe or hose, is provided in the respective connections.

Figure 2:
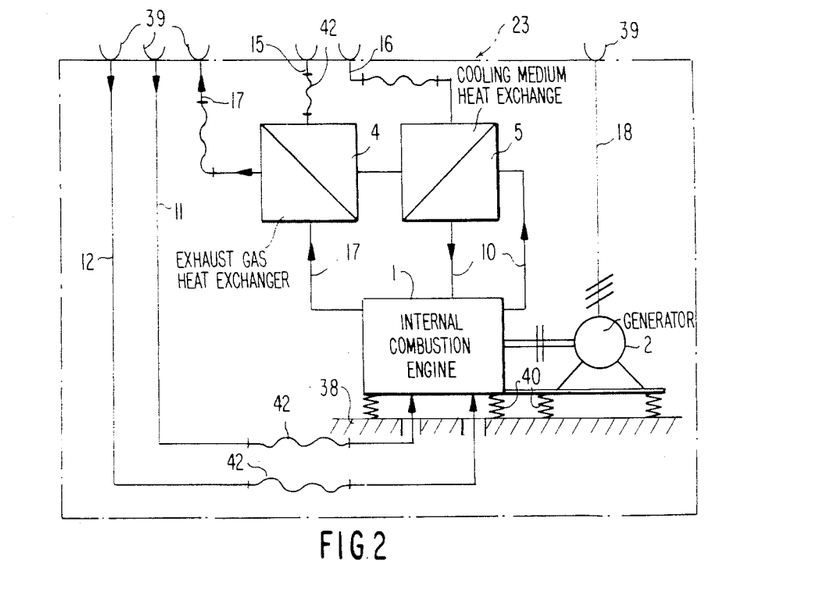
FIG. 2 is a schematic view of another modular unit constructed in accordance with the present invention for generating heat and electricity from waste heat of an internal combustion engine and/or by a generator driven by the engine.

As shown in FIG. 2, an electricity/heat generating unit generally designated by the reference numeral 23 includes an internal combusion engine 1 for driving a generator 2 for generating electricity. As in the heat pump unit 22 in FIG. 1, a cooling medium circulation system 10 and an exhaust gas line 17 extend through corresponding heat exchangers 4, 5 to exploit the waste heat of the internal combustion engine 1 as well as the waste heat of the exhaust gases from the engine 1. The engine waste heat may be drawn off in the heat transfer medium circuit formed by the heating supply line 15 and heating return line 16. The electrical energy generated by the generator 2 may be drawn off by a power line 18 and through corresponding connections 39 provided at an outer wall of the electricity/heat unit 23. As with the heat pump 22, the internal combustion engine 1 and generator 2 are elastically supported on the frame 38 by springs 40 and connecting members are interposed in the various lines for preventing a radiation and transmission of sound to the environment.

Figure 3:
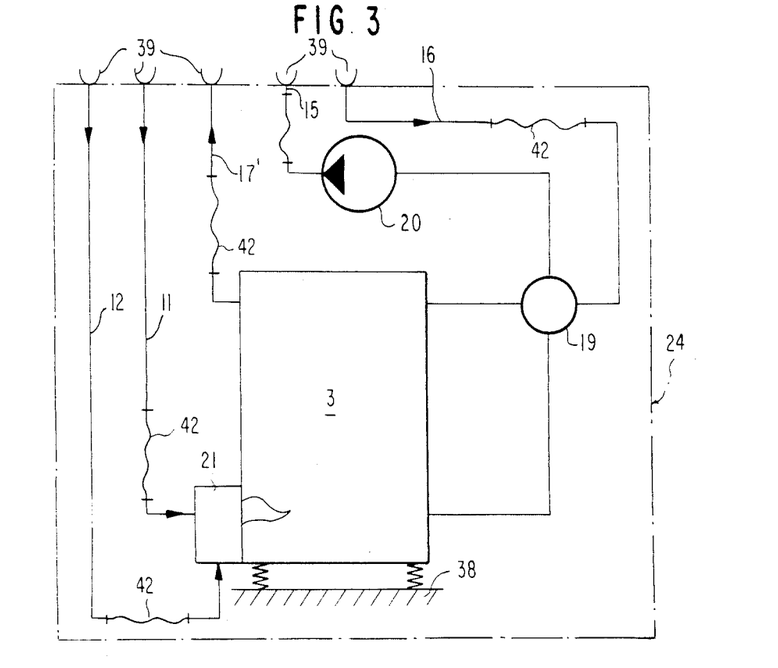
FIG. 3 is a schematic view of a modular unit constructed in accordance with the present invention for generating heat by a heating boiler means.

Even without a high coefficient of utilization of the unit as described above, peaks and demands for heat energy can be compensated by providing heating boilers which require little space or investment. Such peaks could also occur during, for example, repair-related outages of other heating units. For this purpose, as shown in FIG. 3, a boiler unit generally designated by the reference numeral 24 may be provided which includes a boiler 3 and a burner 21, with fuel and combustion air being supplied through a fuel supply line 11 and air intake line 12. Waste heat of the flue gas is utilized within the boiler unit 24 to a large extent so that in an exhaust or gas line 17' no additional heat exchanger need be provided. A mixing valve 19 is arranged in the water circulation system 10' in an area of a water discharge area of the boiler 3. The valve 19 makes it possible to connect the boiler 3 more or less solidly or completely to the heating circuit composed of the heating supply line 15 and heating return line 16. The circulation pump 20 is disposed in the heating supply line 15.

Figure 4:
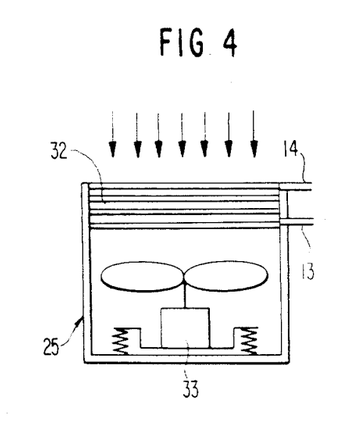
FIG. 4 is a schematic view of a heat exchanger unit for extracting heat from ambient air.

As shown in FIG. 4, a boiler unit generally designated by the reference numeral 25 may be provided and utilized with the heat pump 22 of FIG. 1. The boiler unit 25 is employed to extract heat from the ambient air in order to use the extracted heat for evaporating the circulating medium and the evaporator 8 in the circuit of the heat pump unit 22. Because of the size of the heat exchanger which this requires, a separate unit is needed. The ambient air is delivered in the direction of the arrows in FIG. 4 by a fan through a powerful and large-volume air/fluid heat exchanger 32 which, as noted above, may be a heat source for the evaporator 8 of the heat pump unit 22. Water connections 13, 14 of the heat exchanger 32 are correspondingly connected to the heat source supply and return line 15, 16 of the heat pump unit 22.

Figure 5:
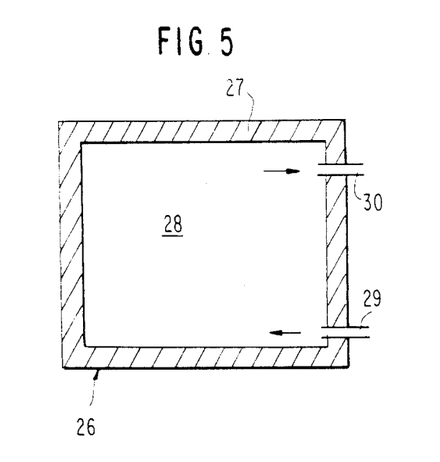
FIG. 5 is a cross sectional view of a heat insulated heat storage unit for a modular system constructed in accordance with the present invention.

To store the heat generated, it is advantageous, as shown in FIG. 5, to provide heat accumulator units generally designated by the reference numeral 26. Each of the heat accumulator units 26 may essentially include only a storage vessel 28 for accommodated heating water or other suitable storage media. The storage vessel 28 is clad with or formed of a good heat insulating material 27. A supply line 29 and a return line 30 are connected to the storage vessel 28 so as to enable a supplying and a returning of the storage medium to the stored vessel 28.

In order to be able to compactly combine the different units 22, 23, 24, 25 together in any form, the units themselves are constructed so as to be statically and functionally independent, with the respective external dimensions being such so as to make the units uniform and easily transportable. For ease of handling by means of appropriate conventional conveyance means, each of the units 22, 23, 24, 25, may include, as shown in FIG. 10, suspension eyes 43. Moreover, to facilitate transport and set up, the external dimensions of the different units 22-25 are uniformly adapted to those of a standard 10 foot container. Additionally, in order to be able to dispense with the separate upper structures, the outer walls 37 of the individual units 22-25 are constructed not only to insulate against sound and heat, but also to be weather proof. Furthermore, to faciliate any maintenance and repair work of the components of the units 22-25, advantageously, the walls 37 are constructed so as to be readily detachable.

As shown most clearly in FIG. 10, the connection means 39, into which the individual lines empty from the inside of the individual units, are arranged in a uniform patter or screen on one lateral surface of the respective units 22-25 in order to facilitate the interconnecting or interwiring of the several like and/or functionally different units 22-25. Additionally, in order to facilitate a running of the connecting lines vertically and horizontally, the connection means 39 are arranged in a straight line and, advantageously, in a plane extending diagonally of the corresponding lateral surfaces of the respective units 22-25. In this manner, the same sequence of connection means 39 is adapted for all of the units 22-25 and, for example, if a certain connection means 39 is missing on a given unit 22-25, then there will be an empty position in the corresponding line of connection means 39.

Figure 7:
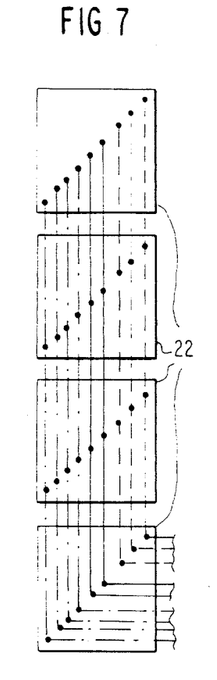
FIGS. 7, 8, and 9 are schematic views respectively depicting a manner in which the different modular units constructed in accordance with the present invention may be combined into a larger power supply system.
Figure 8:
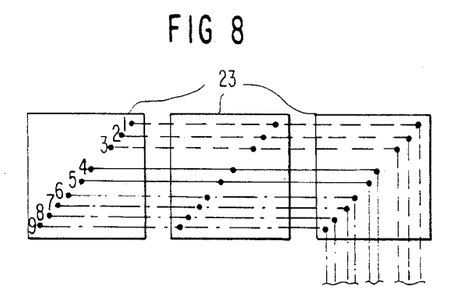

FIG. 7 provides an example of the manner in which four heat pump units 22 may be set on top of the other so as to form a tower, with the individual connection means being interconnected; while FIG. 8 illustrates the manner in which three electricity/heat units 23 may be arranged horizontally and one next to each other. As can readily be appreciated, in this process of combining the units 22-25, appropriate connection lines are interposed between the respective connection means 39 of the units 22-25.

Figure 9:
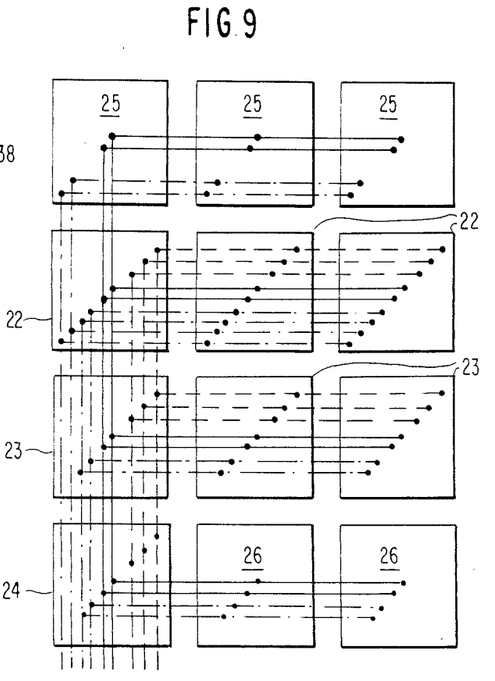

FIG. 9 provides an example of the manner in which several functionally different units 22-25 may be arranged. More particularly, as shown in FIG. 9, three blower units 25 are arranged in a top horizontal row, with three heat pump units 22 being arranged in the next row below the blower units 25. Three electricity/heat units 23 may be disposed in the third horizontal row from the top as well as a blower unit 24 and two heat accumulator units 26 arranged in the bottom row. The diagonal and uniform arrangement of the connection means 39 makes it simple to combine the individual units 22-25 into a large functional block. If need be, more units 22-25 may also be connected or, if the demand for energy drops, the appropriate number of units 22-25 can also be removed. Consequently, the power plant or power system of the present invention can readily adapt its size to changing energy demands and can also be operated in an optimum load range.

Figure 11:
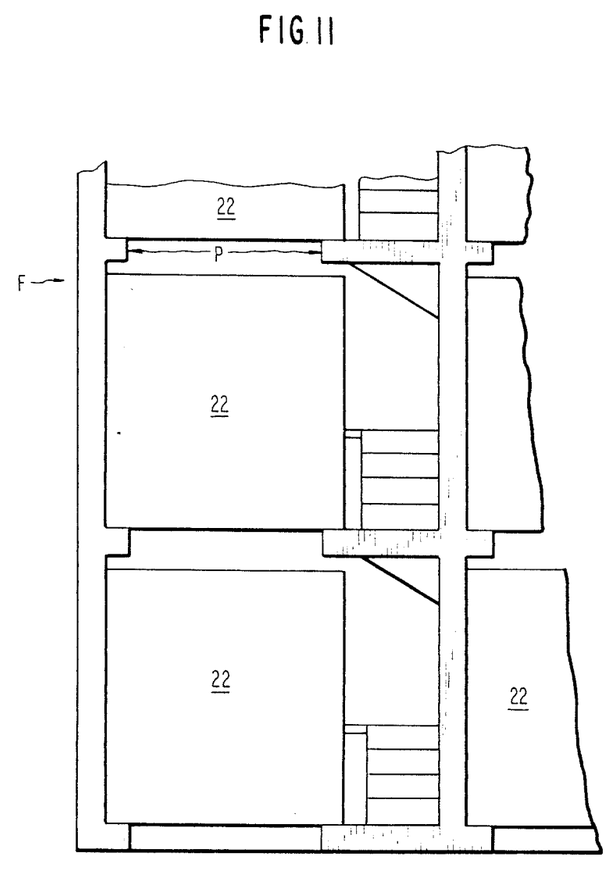
FIG. 11 is a partial schematic front view of a support structure for housing several modular units constructed in accordance with the present invention.
Figure 12:
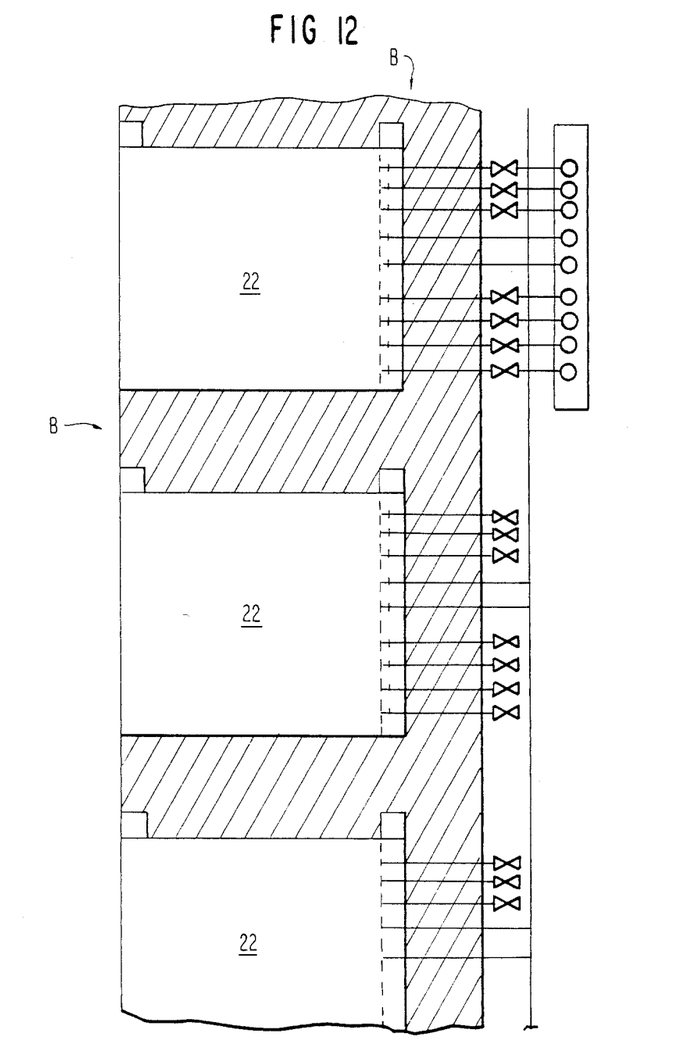
FIG. 12 is a partial schematic top view of the support structure of FIG. 11.

FIGS. 11 and 12 provide an example of one possible compact and rational arrangement of the different units 22-25 in an appropriate supporting frame generally designated by the reference character F, which allows an easy insertion and removal of the respective units 22-25 and also provides good access to the individual units 22-25 on different levels for operating and installation personnel. Due to the fact that the self supporting units 22-25 are supported at few corner points generally designated by the reference character P, it is possible to use a single crane system for all of the stacked units 22-25. Narrow intermediate bridges generally designated by the reference character B are provided on different installation levels thereby making it possible for personnel to connect the respctive units 22-25.

Figure 6:
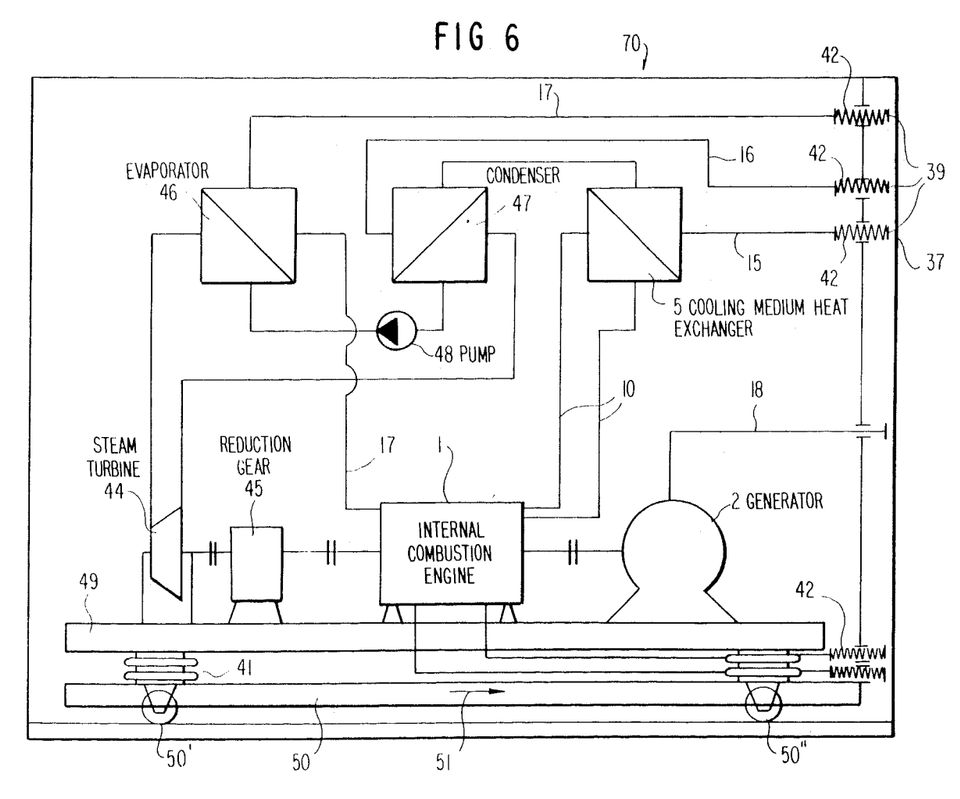
FIG. 6 is a schematic view of a further modular unit constructed in accordance with the present invention with a steam turbine apparatus supplied with exhaust gas heat in a removable engine frame.

FIG. 6 provides an example of a heat and electricity modular unit generally designated by the reference numeral 70, which is constructed in a manner similar to the electricity/heat unit 23 of FIG. 2 but which utilizes an additional process employing the exhaust gas energy of the internal combustion engine 1. For this purpose, a steam turbine 44 drives a generator to through a reduction gear 45 by a crank shaft of the internal combustion engine 1, with the internal combustion engine 1 also driving the electrical generator 2. The exhaust gas line 17 of the internal combustion engine 1 extends through an evaporator 46, with the heat of the exhaust gas being used to evaporate a process median in the evaporator 46. The process medium may, for example, be water, or, preferably, a coolant or hallogenated hydrocarbon such as, for example, a fluorocarbon. Steam, which is decompressed in a steam turbine 44, is delivered through a heat release side of a condenser 47 which may be loaded on a heat absorption side by a relatively greatly cooled heating medium such as water, from the heat return line 16. A circulation pump 48 supplies the condensate from the condenser 47 to the evaporator 46, thereby completing the heating circuit. The heating water or coolant, supplied on the coolant inlet side of the heat exchanger 5, is preheated in the condenser 47 and is completely heated in the coolant heat exchanger 5.

With the heating/electricity unit 70 of FIG. 6, the electrical portion of energy and the coefficient of utilization are larger than in the electricity/heat unit 23 of FIG. 2 and, in particular, a higher proportion of electricity in the power plant may be important for the selection of the unit 70 where there is a corresponding demand situation.

It would also be possible, in addition to the evaporator 46, to house the components required for the add on process utilizing the exhaust gas energy of the internal combustion engine 1, that is, the steam turbine 44 and reduction gear 45, in a separate modular unit and to allow the separate modular unit to act on or operate a separate generator (not shown). Such an approach would be appropriate if the exhaust gas heat from several gasoline fired modular power units is to be utilized in the additional or add on processing of the exhaust gas energy.

It is also possible, as shown in FIG. 6, to further implement the power system or plant of the present invention by, for example, supporting an engine frame 49 by pneumatic spring bellows, of a conventional construction, thereby enabling an effective covering absorbing, or dissipating of a particularly broad frequency spectrum of mechanical oscillations, especially in the high frequency range. To facilitate installation and maintenance, the engine frame 49 may be mounted on a frame 50 disposed on, for example, wheels 50' or the like so as to enable the frame 50 to be displaced in the direction of the arrow 51 in FIG. 6. This construction is particularly appropriate if the self-supporting frames of the different stacked modular units are ridigly connected and form a uniform support structure. Then the engine frames 49 can be subsequently installed by, for example, means of a forklift or crane and can readily be removed for, for example, repair or maintenance.

Advantageously, flexible connecting members are arranged in an area just behind the housing wall 37 so that it is not only possible to decouple or isolate the inner components from the outside with respect to oscillation, but it also is possible to shift, within limits, the connection means 39 which are supported by the flexible connecting members 42 and adapt or align the connection means 39 to a position of the outer mating connections. The connecton means 39 are somewhat recessed with respect to a plane of the housing wall 37 and are arranged in a wall recess or groove in order to protect the connection means 39 against damage during transporting and installation of the individual units. The flexible connecting members 42 extend through the housing wall 37 and are maintained so as to be mobile and sound insulating as well as heat insulated with respect to the housing wall 37.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A power supply system including at least one first statically and functionally independent unit for generating at least one of heat and electricity, a first unit of said at least one independent unit including an internal combustion engine for generating mechanical energy and waste heat, electric generator means driven by the internal combustion engine, frame means for supporting the at least one first unit, and supply and removal line means arranged on one side of the frame means, characterized in that at least one second statically and functionally independent unit is provided for generating at least one of heat and electricity, said at least one second unit includes supply and return line means disposed on one side thereof and adapted to be accommodated in the frame means with the supply and return line means thereof disposed on the same side of the frame means as the supply and return line means of the at least one first unit, each of the supply and return line means of each of the units terminating in a connection means for enabling a connection between the units, the connection means of each of the units including a plurality of connections which are disposed diagonally across a grid pattern on one side of the respective units, and in that the grid pattern is the same for all of the units.

2. A power supply system according to claim 1, characterized in that the at least one first and at least one second independent units are respectively accommodated in a cube-shaped, size coordinated stackable housing means.

3. A power supply system according to claim 1, characterized in that the at least one second unit includes a heat pump means comprising an internal combustion engine for generating mechanical energy and waste heat, and a compressor means driven by the last-mentioned internal combustion engine.

4. A power supply system according to claim 1, characterized in that a unit of the at least one second unit includes an internal combustion engine for generating waste heat and mechanical energy, steam turbine means coupled to a drive shaft of the last-mentioned internal combustion engine for driving said electric generator, evaporator means through which an exhaust gas line of the last mentioned internal combustion engine extends, condenser means supplied on a heat absorption side with a fluid for condensing steam from the steam turbine, and means for supplying condensate from the condenser means to the evaporator means.

5. A power supply system according to claim 1, characterized in that the at least one second unit includes a boiler means having a burner for heating a fluid, and a pump means for delivering a heated fluid to the associated supply line means.

6. A power supply system according to claim 1, characterized in that the at least one second independent unit includes a heat exchanger means for extracting heat from ambient air, the heat exchanger means including an air-fluid heat exchanger, fan means for delivering ambient air to the heat exchanger means, motor means for driving the fan means, and pump means for circulating fluid in the heat exchanger means.

7. A power supply system according to claim 1, characterized in that at least one functional unit comprises energy storage means for storing heat including a heat insulated storage vessel, said energy storage means being adapted to be supported by said frame means.

8. A power supply system according to one of claims 1, 3, 4, 5, 6, or 7, characterized in that at least one functional unit comprises fuel storage means for storing fuel for the other of said respective units, said fuel storage means being adapted to be supported by said frame means.

9. A power supply system according to claim 8, characterized in that flexible connecting means are interposed in each of the supply and return line means for isolating components of each of the units, other than a functional unit comprising an energy or fuel storage means, with respect to oscillations and to enable a limited shifting so as to facilitate interconnection of all of the units via said connection means arranged in said grid pattern.

10. A power supply system according to claim 9, characterized in that the flexible connecting members are arranged in an area of the respective connection means.

11. A power supply system according to claim 10, characterized in that each of the units is accommodated in a housing means, and in that the flexible connecting means are disposed in an area just rearwardly of a plane of a wall of the housing means.

12. A power supply system according to one of claims 1, 3, or 4, characterized in that means are provided for elastically supporting at least the internal combustion engine of each of the units.

13. A power supply system according to claim 12, characterized in that said means for supporting includes a plurality of individual springs.

14. A power supply system according to claim 12, characterized in that said means for supporting includes an air suspension means for providing support by air suspension.

15. A power supply system according to claim 12, characterized in that each unit includes independent starting and control means for starting and controlling the operation thereof.

16. A power supply system according to claim 15, characterized in that the control means is adapted to operate the respective units alone and when interconnected with other units.

17. A power supply system according to one of claim 1, 2, 3, or 4, characterized in that each of the units is accommodated in an housing means, and in that the housing means is constructed so as to be weather proof.

18. A power supply system according to claim 17, characterized in that each housing means includes a plurality of spaced lateral walls and in that means are provided in at least one of the lateral walls for enabling access to an interior of the housing means.

19. A power supply system according to claim 18, characterized in that each of the housing means has an identical external dimension so as to enable accommodation in the frame means.

20. A power supply system according to claim 19, characterized in that means are provided on at least one of the frame means and respective housing means for enabling a transfer of the housing means by a crane.

21. A power supply system according to claim 3, characterized in that at least one third statically and functionally independent unit is provided for generating at least one of heat and electricity, the at least one third unit includes an internal combustion engine for generating waste heat and mechanical energy, a steam turbine means coupled to a drive shaft of the last mentioned internal combustion engine for driving said electric generator, evaporator means through which an exhaust gas line of the last mentioned internal combustion engine extends, condenser means supplied on a heat absorption side with a fluid for condensing steam from the steam turbine, and means for supplying condensate from the condenser means to the evaporator means.

22. A power supply system according to claim 3, characterized in that at least one third statically and functionally independent unit is provided including boiler means having a burner for heating a fluid, and a pump means for delivering the heated fluid to the associated supply line means.

23. A power supply system according to claim 3, characterized in that at least one third statically and functionally independent unit is provided including a heat exchanger means for extracting heat from ambient air, the heat exchanger means including an air-fluid heat exchanger, a fan means for delivering ambient air to the heat exchanger means, motor means for driving the fan means, and pump means for circulating fluid in the heat exchanger means.

24. A power supply system according to claim 3, characterized in that at least one functional unit comprises energy storage means for storing heat including a heat insulated storage vessel, said energy storage means being adapted to be supported by said frame means.

25. A power supply system according to claim 21, characterized in that at least one fourth statically and functionally independent unit is provided including boiler means having a burner for heating a fluid, a pump means for delivering a heated fluid to the associated supply line means.

26. A power supply system according to claim 21, characterized in that at least one fourth statically and functionally independent unit is provided including a heat exchanger means for extracting heat from ambient air including an air-fluid heat exchanger, a fan means for delivering ambient air to the heat exchanger means, motor means for driving the fan means, and pump means for circulating fluid in the heat exchanger means.

27. A power supply system according to claim 21, characterized in that at least one functional unit comprises energy storage means for storing heat including a heat insulated storage vessel, said energy storage means being adapted to be supported by said frame means.

28. A power supply system according to claim 25, characterized in that at least one fifth statically and functionally independent unit is provided including a heat exchanger means for extracting heat from ambient air including an air-fluid heat exchanger, a fan means for delivering ambient air to the heat exchanger means, motor means for driving a fan means, and pump means for circulating fluid in the heat exchanger means.

29. A power supply system according to claim 25, characterized in that at least one functional unit comprises energy storage means for storing heat including a heat insulated storage vessel, said energy storage means being adapted to be supported by said frame means.

* * * * *